US009422858B2

(12) United States Patent
Lombard et al.

(10) Patent No.: US 9,422,858 B2
(45) Date of Patent: Aug. 23, 2016

(54) TURBOCHARGER WITH AN ANNULAR ROTARY BYPASS VALVE

(71) Applicant: Honeywell International Inc., Morristown, NJ (US)

(72) Inventors: Alain Lombard, Chavelot (FR); Valerie Bribant, Golbey (FR); Antoine Costeux, Golbey (FR)

(73) Assignee: Honeywell International Inc., Morris Plains, NJ (US)

( * ) Notice: Subject to any disclaimer, the term of this patent is extended or adjusted under 35 U.S.C. 154(b) by 154 days.

(21) Appl. No.: 14/218,068

(22) Filed: Mar. 18, 2014

(65) Prior Publication Data

US 2015/0267605 A1 Sep. 24, 2015

(51) Int. Cl.
| F02D 23/00 | (2006.01) |
| F02B 37/18 | (2006.01) |
| F01D 17/10 | (2006.01) |
| F02C 6/12 | (2006.01) |

(52) U.S. Cl.
CPC ............ *F02B 37/183* (2013.01); *F01D 17/105* (2013.01); *F02C 6/12* (2013.01); *F05D 2210/12* (2013.01); *F05D 2220/40* (2013.01); *F05D 2250/411* (2013.01); *F05D 2270/05* (2013.01)

(58) Field of Classification Search
CPC ...... F02B 37/183; F02C 6/12; F05D 2210/12; F05D 2220/40; F05D 2270/05
USPC .......................................................... 60/602
See application file for complete search history.

(56) References Cited

U.S. PATENT DOCUMENTS

| 7,272,929 | B2* | 9/2007 | Leavesley | ............... F04D 25/04 415/158 |
| 7,559,199 | B2* | 7/2009 | Sausse | .................. F01D 17/165 415/159 |
| 8,573,929 | B2* | 11/2013 | Lombard | .............. F01D 17/105 415/145 |
| 2011/0173973 | A1* | 7/2011 | Cattani | .................. F01D 17/143 60/602 |
| 2011/0268559 | A1 | 11/2011 | Lombard et al. | |
| 2013/0251512 | A1 | 9/2013 | Lombard et al. | |

FOREIGN PATENT DOCUMENTS

EP 2306054 A1 4/2011

OTHER PUBLICATIONS

EPO Search & Opinion for EP Appl. No. 15157651.9 dated Jul. 28, 2015.

* cited by examiner

*Primary Examiner* — Thomas Denion
*Assistant Examiner* — Thomas Olszewski
(74) *Attorney, Agent, or Firm* — John C. James (57) ABSTRACT

A turbocharger includes an annular bypass passage with an annular bypass valve disposed therein. The bypass valve includes a fixed annular valve seat and a rotary annular valve member disposed against the valve seat. The valve member is rotatable about the axis for varying a degree of alignment between orifices in the valve seat and valve member so as to form flow passages having a flow area A for exhaust gas. The orifices are shaped to provide a first phase of evolution of the flow area A from zero up to a value $A_1$ and then a second phase of evolution from the value $A_1$ up to a value $A_2$, and such that the first and second phases have distinctly different slopes on a curve of flow area versus rotational position of the valve member, with a distinct break point in the curve between the first and second phases.

6 Claims, 6 Drawing Sheets

TURBOCHARGER WITH AN ANNULAR ROTARY BYPASS VALVE

BACKGROUND OF THE INVENTION

The present disclosure relates to exhaust gas-driven turbochargers, and particularly to turbine arrangements that allow exhaust gas to bypass the turbine under certain engine operating conditions.

In a conventional turbocharger, the turbine housing defines a bypass conduit located generally to one side of the main bore through the housing, and the bypass conduit is connected to the exhaust gas inlet or the volute of the housing via a bypass valve. The bypass valve typically is a swing or poppet style valve comprising a circular valve member that is urged against a flat valve seat surrounding the bypass passage opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed bypass valve is a cause of performance degradation of the turbine and, hence, the turbocharger and its associated engine. The typical solution to the leakage issue is to preload the bypass valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly non-linear with valve position, which makes it very difficult to properly regulate the bypass flow rate. This leads to problems such as poor transient response of the turbocharger and engine system.

BRIEF SUMMARY OF THE DISCLOSURE

The present disclosure describes various embodiments of turbochargers having a novel bypass arrangement that seeks to address issues such as the ones noted above. In one embodiment, a turbocharger comprises a compressor wheel mounted within a compressor housing, a turbine housing defining at least part of a generally annular chamber extending circumferentially about a longitudinal axis of the turbine housing, the turbine housing defining a bore extending along the longitudinal axis, and a turbine wheel disposed in the turbine housing. A nozzle passage leads from the chamber radially inwardly into the turbine wheel. The turbine housing defines an annular bypass passage surrounding the bore and arranged to allow exhaust gas in the chamber to bypass the turbine wheel.

There is an annular bypass valve disposed in the bypass passage, the bypass valve comprising a fixed annular valve seat and a rotary annular valve member that is disposed against the valve seat and is rotatable about the longitudinal axis. One of the valve seat and the valve member defines a non-circular first orifice extending axially therethrough and the other of the valve seat and the valve member defines a non-circular second orifice extending axially therethrough, forming an orifice pair. The first and second orifices are arranged to overlap in some rotational positions of the valve member so as to create a flow passage formed by aligned portions of the first and second orifices.

The first orifice has a first leading edge and a first trailing edge with respect to a rotational direction of the valve member for opening the flow passage, and the second orifice has a second leading edge and a second trailing edge with respect to said rotational direction, such that beginning with the flow passage of the orifice pair closed, as the valve member is rotated in said rotational direction the first orifice begins to overlap with the second orifice so as to create the flow passage for exhaust gas, the flow passage evolving in flow area A with continued rotation of the valve member until a maximum flow area $A_{max}$ is reached when there is full overlap between the first and second orifices. The first leading edge and the second leading edge are shaped such that there is a first phase of evolution of the flow area A from zero up to a value $A_1$ and then a second phase of evolution of the flow area from the value $A_1$ up to a value $A_2$, and such that the first phase and the second phase have distinctly different slopes on a curve of flow area versus rotational position of the valve member, with a distinct break point in the curve between said first and second phases.

In some embodiments, the first leading edge and the second leading edge are shaped such that there is a third phase of evolution of the flow area, the second and third phases having distinctly different slopes on the curve of flow area versus rotational position of the valve member, with a distinct break point in the curve between said second and third phases.

In some embodiments, there are a plurality of first orifices spaced apart in a circumferential direction of the bypass valve and a like plurality of second orifices spaced apart in the circumferential direction, forming a plurality of orifice pairs each configured to have said first and second phases of evolution of the flow area.

In an exemplary embodiment described herein, the first and second orifices are L-shaped, each having a circumferential portion extending primarily in a circumferential direction of the bypass valve and a radial portion extending primarily in a radial direction of the bypass valve, and configured such that the first phase of evolution of the flow area is when primarily the circumferential portions of the first and second orifices become overlapped, and the second phase is when additionally the radial portions become overlapped.

In another exemplary embodiment, the first orifices are T-shaped, each having a generally rectangular portion and a protruding portion that protrudes in the circumferential direction from the generally rectangular portion, wherein the first phase of evolution of the flow area is when primarily the protruding portions of the first orifices become overlapped with the second orifices, and the second phase is when additionally the generally rectangular portions of the first orifices become overlapped with the second orifices.

At least one of the first orifices can have a different shape from other ones of the first orifices, and correspondingly at least one of the second orifices can have a different shape from other ones of the second orifices, the/each differently shaped first orifice forming an orifice pair with the/each differently shaped second orifice.

In some embodiments, one of the valve member and the valve seat includes raised pads surrounding the respective first or second orifices therein, the pads being in contact with a substantially planar surface of the other of the valve member and the valve seat so as to provide sealing between the valve member and the valve seat.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
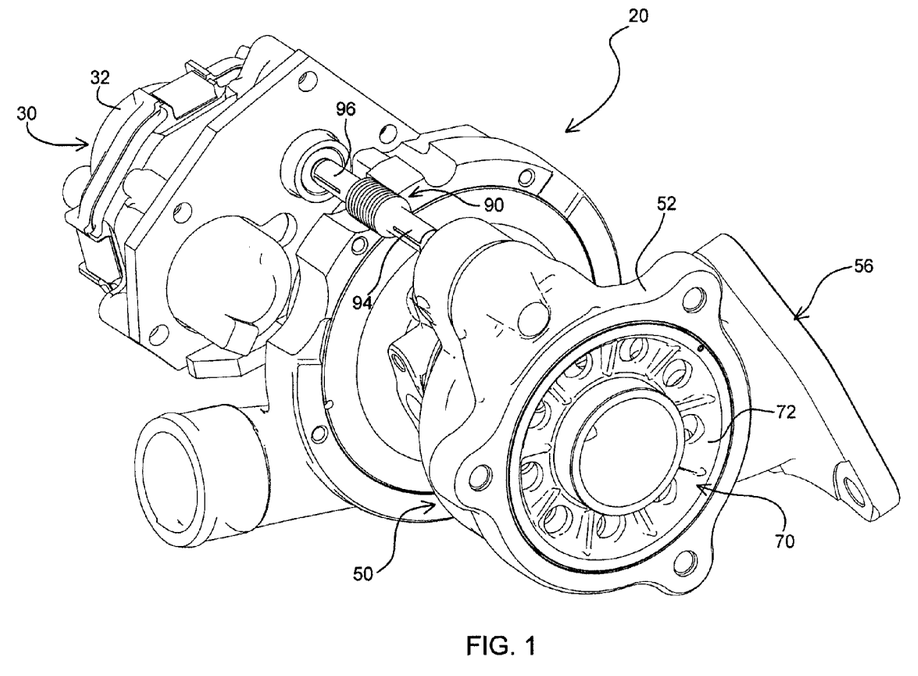
FIG. 1 is perspective view of a turbocharger that is useful with embodiments of the present invention.
Figure 2:
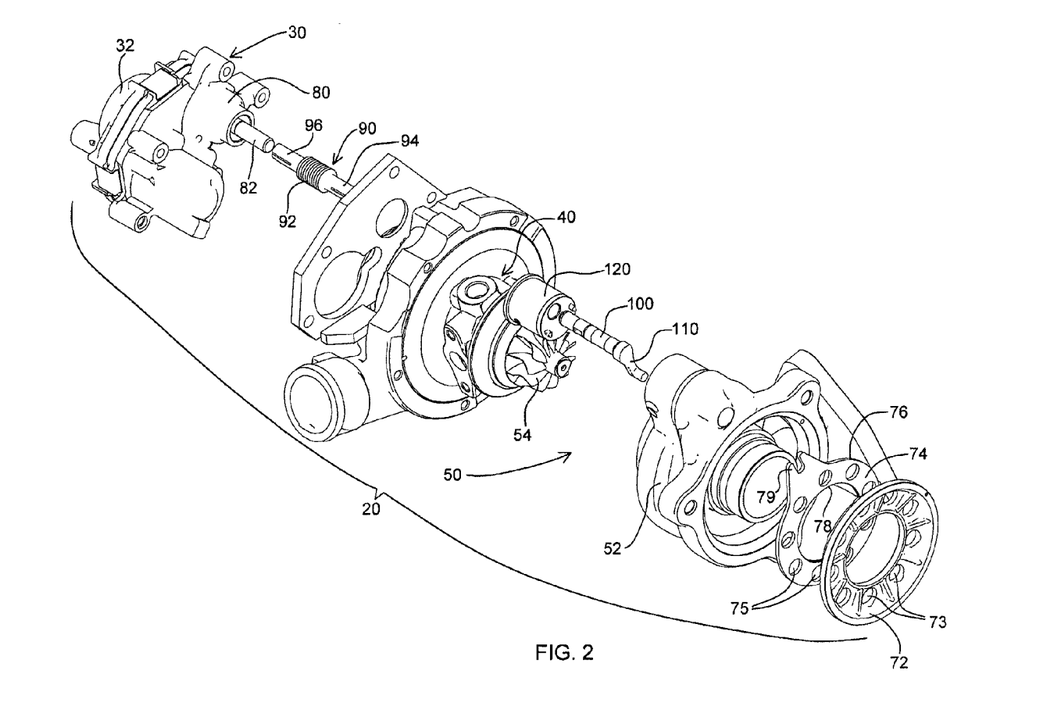
FIG. 2 is an exploded perspective view of the turbocharger of FIG. 1.
Figure 3:
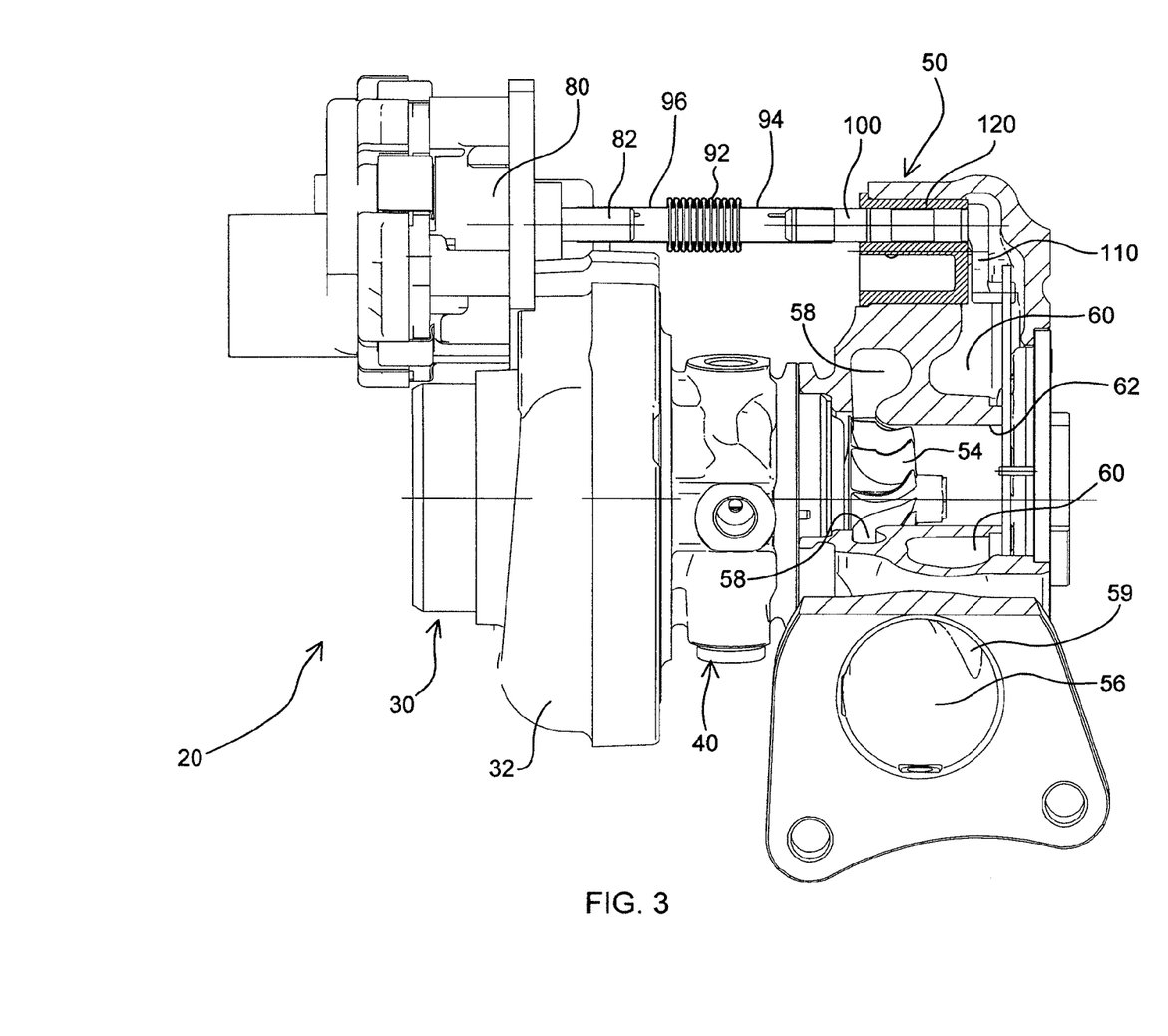
FIG. 3 is a side view of the turbocharger of FIG. 1, partly in section to show internal details in the region of the turbine.

A turbocharger 20 in which embodiments of the present invention may be employed is shown in FIGS. 1 through 3. As shown, major sub-assemblies of the turbocharger 20 include a compressor assembly 30 and a turbine assembly 50. The compressor assembly 30 includes a compressor housing 32 and a compressor wheel (not visible in the drawings) mounted therein and attached to one end of a rotary shaft (not visible). A center housing assembly 40 includes a center housing that is affixed to the compressor housing 32 and that contains bearings for the rotary shaft. The turbine assembly 50 includes a turbine housing 52 and a turbine wheel 54 mounted therein and attached to the opposite end of the rotary shaft.

With particular reference to FIG. 3, the turbine housing 52 defines an exhaust gas inlet 56 through which exhaust gas from an internal combustion engine is received, and a volute or annular chamber 58 that receives the exhaust gas from the inlet 56 and distributes the gas around the 360° chamber for feeding into the turbine wheel 54. The exhaust gas inlet 56 is also connected via a connecting passage 59 to a generally annular bypass volute 60 defined in the turbine housing 52. The bypass volute 60 surrounds an axial bore 62 defined in the turbine housing. Exhaust gas that has passed through the turbine wheel 54 is exhausted from the turbine housing through the bore 62. The bypass volute 60 provides an alternative pathway for exhaust gas to flow without first having to pass through the turbine wheel 54. The gas can flow through the bypass volute 60, however, only if the bypass valve described below is open.

With reference particularly to FIG. 2, an annular bypass valve 70 is installed in the bypass volute 60 for regulating flow through the bypass volute. The major components of the annular bypass valve 70 include a stationary valve seat 72 and a rotary valve member 74 in abutting engagement with the valve seat. The valve seat 72 and valve member 74 are arranged between an annular outer portion 52a of the turbine housing 52 and an annular inner member 53. The inner member 53 is tubular in form. In the illustrated embodiment the inner member 53 is integral with the rest of the turbine housing, but alternatively the inner member can be a separately formed tubular member that is fitted into the turbine housing. Making the inner member 53 as an integral part of the turbine housing can improve rigidity and robustness of the construction. The valve member 74 is prevented from moving axially upstream (forward) by a tapering part of the outer portion 52a of the turbine housing, although during operation pressure of the exhaust gas urges the valve member 74 in the downstream direction against the valve seat 72. The valve member 74 is not constrained by the turbine housing but is free to rotate about its axis and to move axially against the valve seat 72. The valve seat 72 is prevented from moving axially, radially, or rotationally.

The valve seat 72 (best illustrated in FIG. 2) is a generally flat ring-shaped or annular member having a plurality of orifices 73 circumferentially spaced apart about a circumference of the valve seat, the orifices 73 extending generally axially between the upstream and downstream faces of the valve seat. The orifices 73 in the illustrated embodiment are uniformly spaced about the circumference of the valve seat, but as further described below, non-uniform spacing of the orifices is also possible and can be advantageous in some circumstances. The valve seat 72 can be formed by any of various processes and materials. For example, processes that can be used include casting, casting and machining, and stamping. The illustrated valve seat 72, which includes solid reinforcing ribs between the orifices 73, cannot feasibly be made by a stamping process, but can be made by casting and machining.

The rotary valve member 74 is a generally flat ring-shaped or annular member having a plurality of orifices 75 circumferentially spaced apart about a circumference of the valve seat, the orifices 75 extending generally axially between the upstream and downstream faces of the valve member. The orifices 75 in the illustrated embodiment are uniformly spaced about the circumference of the valve member, and the number and spacing of the orifices 75 in the valve member are the same as the number and spacing of the orifices 73 in the valve seat. However, as further described below, non-uniform spacing of the orifices 75 is also possible and can be advantageous in some circumstances; furthermore, the spacings of the orifices 73 and 75 do not have to be the same, and in some cases it can be advantageous for the spacings to be different. The valve member 74 has a substantially circular outer edge 76 and a substantially circular inner edge 78, the outer and inner edges 76, 78 being coaxial with respect to a central longitudinal axis of the valve member, which axis is also substantially coincident with a central longitudinal axis of the valve seat 72. The outer portion 52a of the turbine housing and the inner member 53 both define substantially circular bearing surfaces for the outer and inner edges 76, 78 of the rotary valve member 74 and there are clearances therebetween, so that the valve member can be rotated in one direction or the opposite direction about its central longitudinal axis in order to vary a degree of alignment between the valve member orifices 75 and the valve seat orifices 73, as further described below.

With reference to FIG. 2, rotation of the valve member 74 is accomplished by a rotary actuator 80 having an output shaft 82 that is connected to one end of a rotary drive member 90. Connected to the opposite end of the drive member 90 is a drive shaft 100. The output shaft 82, rotary drive member 90, and drive shaft 100 are generally collinear, having a common axis, referred to herein as the drive axis, that is parallel to and transversely offset from the longitudinal axis about which the valve member 74 rotates. A drive arm 110 is connected to the drive shaft 100. The drive arm 110 is generally "L"-shaped, having a portion that extends generally perpendicular to the drive axis, and a distal end (i.e., the end remote from the end that is connected to the drive shaft 100) that defines a pin or rod portion 112 that extends generally parallel to the drive axis. The valve member 74 includes a fork 79 that receives the pin portion 112 of the drive arm 110. Rotation of the rotary actuator's output shaft 82 causes the drive member 90 to rotate about the drive axis, which causes the drive shaft 100 to rotate and therefore the distal end of the drive arm 110 sweeps through an arc, thereby causing the valve member 74 to rotate about its longitudinal axis. Thus, rotation of the actuator in one direction will rotate the valve member in a first direction (opposite to that of the actuator), and rotation of the actuator in the other direction will cause the valve member to rotate in a second direction.

The rotary drive member 90 can include a lengthwise section whose bending flexibility is substantially greater than that of the remaining portions of the drive member. The bending flexibility preferably is substantially greater about multiple axes that are not parallel to the drive axis about which the drive member rotates to impart movement to the drive arm 110. In one embodiment, as shown, the section of greater flexibility is a bellows 92. The drive member 90 is preferably formed of a resilient metal such that the bellows 92 can act as a spring in axial compression and will also return to a straight (i.e., unbent) condition after any bending force is removed. The rotary drive member has an integral first hollow cylindrical portion 94 at a first end of the bellows 92, and an integral second hollow cylindrical portion 96 at an opposite second end of the bellows. The drive shaft 100 is rigidly affixed to the first hollow cylindrical portion 94 and the actuator output shaft 82 is rigidly affixed to the second hollow cylindrical portion 96. For example, each of the shafts 82 and 100 can be inserted into the respective hollow cylindrical portions and can be welded in place.

As noted, the bellows 92 can act like a compression spring along the drive axis. This can be used to advantage for taking up any axial play in the linkage between the actuator 80 and the drive arm 110. Accordingly, the bellows can be axially compressed so as to create an axial compressive pre-load in the bellows. For example, with reference to FIG. 3, with the turbocharger substantially assembled and the hollow cylindrical portion 94 already welded to the drive shaft 100 but the other hollow cylindrical portion 96 not yet welded to the actuator output shaft 82, the bellows 92 can be axially compressed by a determined amount, and then the hollow cylindrical portion 96 can be welded to the actuator output shaft 82.

With reference to FIG. 3, the turbocharger includes a bushing 120 for the drive shaft 100. The bushing is installed in a cavity 55 defined in the turbine housing 52. The bushing defines a through passage 122 for the drive shaft 100. The through passage 122 has a cylindrical inner surface of a diameter sized to fit closely about the drive shaft 100 while still allowing the drive shaft to freely rotate about the axis defined by the inner surface. An end of the drive shaft 100 extends out the end of the through passage 122 and connects to the drive arm 110.

In accordance with the invention, the orifices 73 and 75 of the bypass valve are specially shaped for controlling the evolution of the flow area through the flow passages formed by the overlapping portions of each orifice pair 73/75. FIGS. 1 and 2 illustrate the orifices as being circular, and thus are not within the scope of the present invention. Rather, in accordance with the present invention, the orifices 73 and 75 are non-circular (see for example FIGS. 4 and 5) and are shaped to provide a staged or sequential evolution of the flow area in which a first phase of the flow area evolution and a subsequent second phase of the flow area evolution are characterized by distinctly different slopes on a curve of flow area versus rotational position of the valve member 74, with a break point defined between these two phases of the curve. The invention is not limited to two such phases, and in an embodiment described herein there are three distinct phases.

Figure 4A:
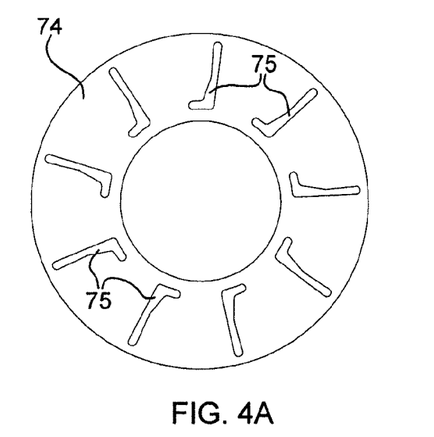
FIG. 4A is a plan view of a valve member in accordance with a first embodiment of the invention.
Figure 4B:
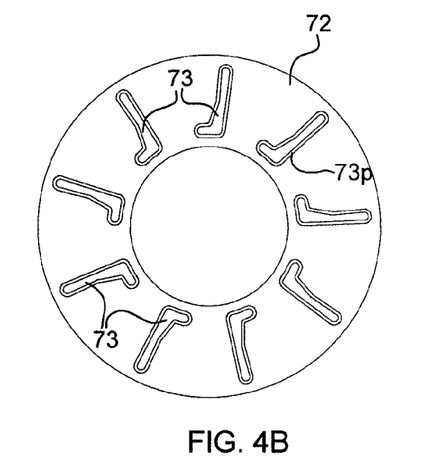
FIG. 4B is a plan view of a valve seat in accordance with the first embodiment.
Figure 4C:
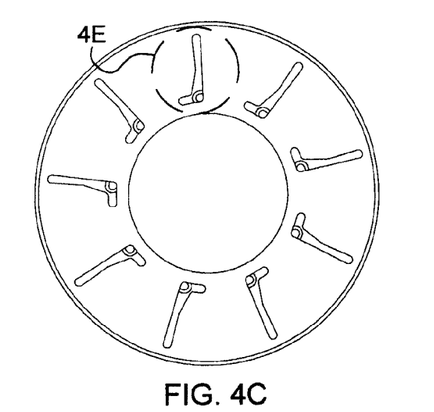
FIG. 4C is plan view of an assembly of the valve member and valve seat in accordance with the first embodiment, with the valve seat in a first rotational position.
Figure 4D:
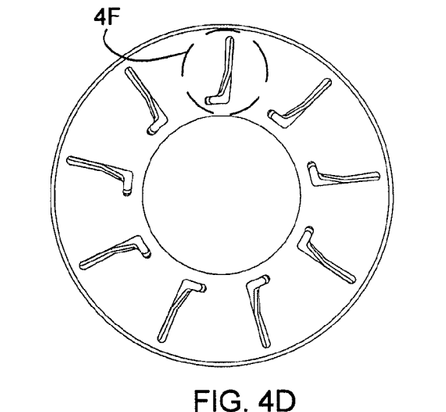
FIG. 4D is a view similar to FIG. 4C, with the valve member in a second rotational position.
Figure 4E:
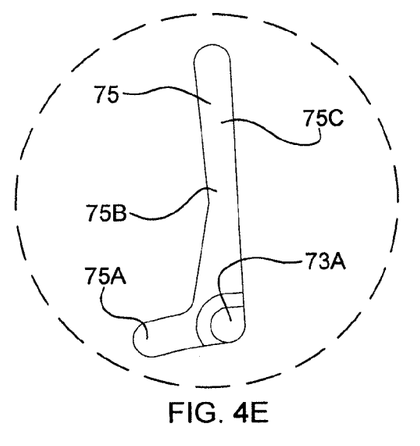
FIG. 4E is a magnified detail view of a portion of FIG. 4C.
Figure 4F:
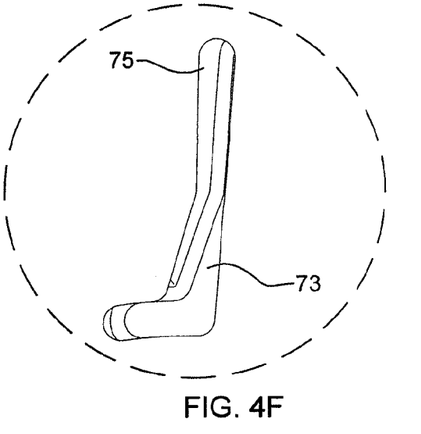
FIG. 4F is a magnified detail view of a portion of FIG. 4D.

Thus, with reference to FIGS. 4A through 4F, a first embodiment of an assembly of a valve seat 72 and a valve member 74 is illustrated. FIG. 4A is a plan view of the valve member 74, FIG. 4B is a plan view of the valve seat 72, and FIG. 4C and FIG. 4D show a plan view of the valve member assembled with the valve seat, with the valve member in two different rotational positions in FIGS. 4C and 4D. The valve seat 72 defines a plurality of circumferentially spaced orifices 73 each surrounded by a raised pad 73p for contacting a substantially planar face of the valve member 74. The orifices 73 are generally L-shaped. The valve member 74 correspondingly defines a plurality of circumferentially spaced orifices 75 that are likewise generally L-shaped. With particular reference to FIG. 4E, the orifices 75 have three portions: a first portion 75A that extends primarily in the circumferential direction of the valve member 74, a second portion 75B that forms an obtuse angle with the first portion and extends primarily in the radial direction, and a third portion 75C that forms an obtuse angle with the second portion and extends primarily in the radial direction. As explained in greater detail below, these three portions of the valve member orifices 75 interact with the similarly configured orifices 73 of the valve seat to provide three distinct phases in the curve of flow area versus valve member rotational position as the orifices 73/75 begin to overlap and then become further overlapped with further rotation of the valve member.

Figure 4G:
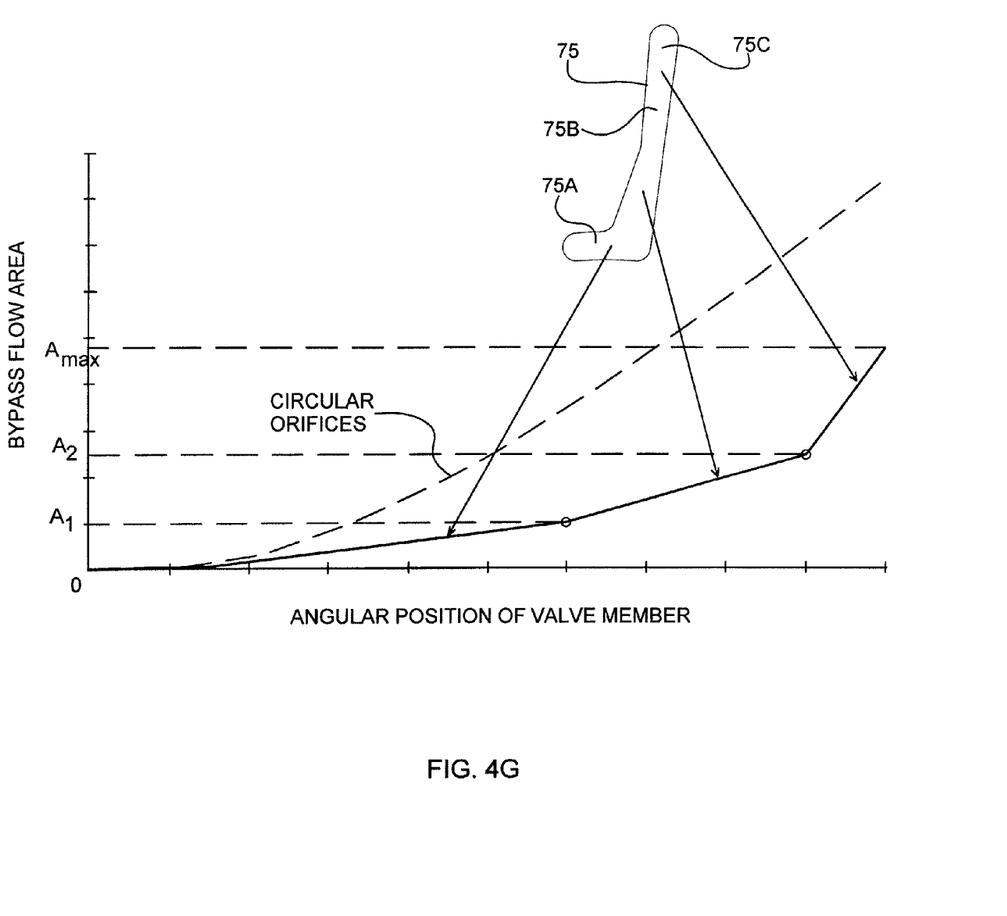
FIG. 4G is a graph showing the relationship between bypass valve flow area and valve member rotational position, comparing a curve for circular orifices (dashed line) with a curve for the L-shaped orifices of FIGS. 4A-F.
Figure 5A:
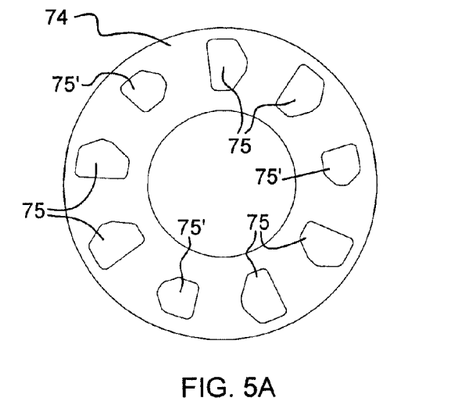
FIG. 5A is a plan view of a valve member in accordance with a second embodiment of the invention.
Figure 5B:
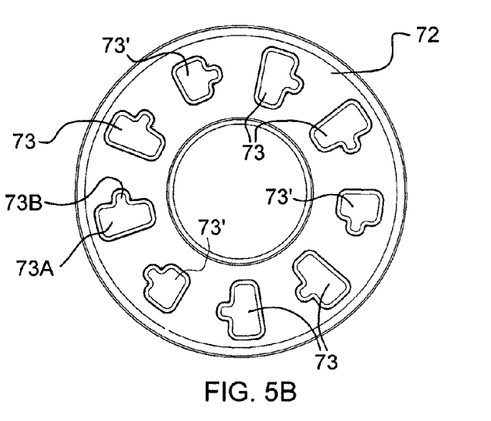
FIG. 5B is a plan view of a valve seat in accordance with the second embodiment.
Figure 5C:
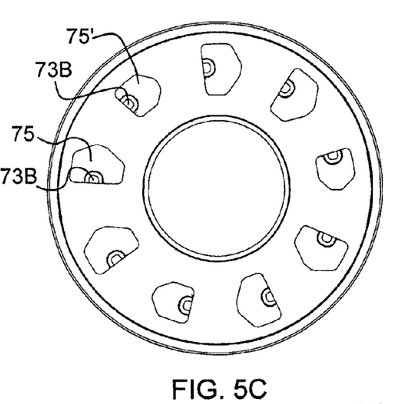
FIG. 5C is a plan view of an assembly of the valve member and valve seat in accordance with the second embodiment, with the valve seat in a first rotational position.
Figure 5D:
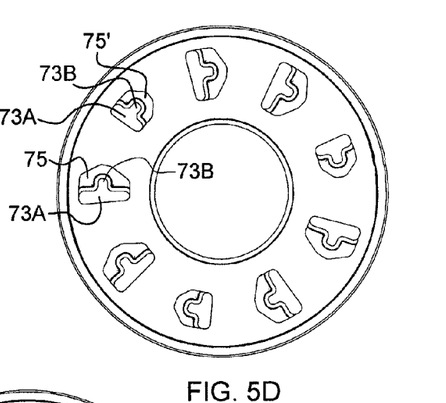
FIG. 5D is a view similar to FIG. 5C, with the valve member in a second rotational position.
Figure 5E:
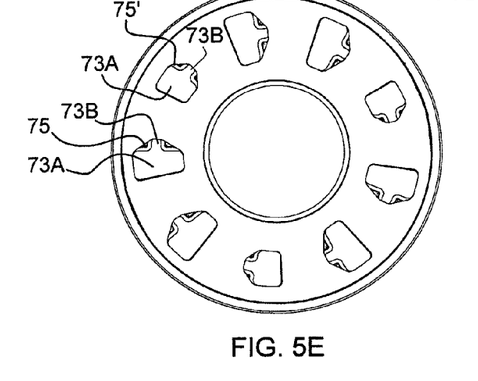
FIG. 5E is a view similar to FIGS. 5C and 5D, with the valve member in a third rotational position.

FIG. 4G shows an exemplary plot of bypass valve flow area versus valve member angular position. The dashed line shows the curve of flow area versus angular position for circular orifices 73/75. The solid line shows the curve of flow area versus angular position for the L-shaped orifices 73/75 shown in FIGS. 4A-F. The solid-line curve exhibits three distinct phases: a first phase extending from zero flow area up to a first value $A_1$, obtained primarily by the overlapping of the first portions 75A of the valve member orifices with the corresponding first portions 73A of the valve seat orifices (FIGS. 4C and 4E); a second phase extending from flow area $A_1$ up to a second value $A_2$, obtained additionally by the overlapping of the second portions 75B of the valve member orifices with corresponding second portions of the valve seat orifices (FIGS. 4D and 4F); and a third phase extending from flow area $A_2$ up to a maximum flow area $A_{max}$, obtained additionally by overlapping of the third portions 75C of the valve member orifices with the corresponding third portions of the valve seat orifices until the orifices 73/75 overlap to a maximum extent. The curve for the L-shaped orifices also has distinct break points between the first and second phases and between the second and third phases, on account of the distinctly different slopes in the different phases; the break points are denoted by the circle points in FIG. 4G.

The present invention is not limited to the L-shaped orifices, or any particular orifice shape, except that the orifice shapes in accordance with the invention must provide distinctly different slopes on a curve of flow area versus rotational position of the valve member, with a distinct break point in the curve between the different phases of evolution of the flow area. For example, FIGS. 5A through 5E show an alternative embodiment of an assembly of a valve seat 72 and a valve member 74 in accordance with the invention. The valve seat orifices 73 are T-shaped, each having a generally rectangular portion 73A and a protruding portion 73B that protrudes in the circumferential direction from the generally rectangular portion. The valve member orifices 75 are generally pentagon-shaped, although they could have other shapes. In accordance with this embodiment, the first phase of evolution of the flow area is when primarily the protruding portions 73B of the valve seat orifices become overlapped with the valve member orifices 75, and the second phase is when additionally the generally rectangular portions 73A of the valve seat orifices become overlapped with the valve member orifices.

It will also be noted in FIGS. 5A-E that the valve seat orifices are of two types: a first set of orifices 73 has a first size/shape, and a second set of orifices 73' has a second (different) size/shape. In the illustrated embodiment, proceeding circumferentially about the valve seat, there are two adjacent orifices 73, followed by an orifice 73', then two more adjacent orifices 73, then another orifice 73', followed by two more orifices 73. Correspondingly, the valve member orifices are of two types, arranged in a corresponding fashion to those of the valve seat: a first set of orifices 75 has a first size/shape, and a second set of orifices 75' has a second (different) size/shape.

In the illustrated embodiments described herein, the valve seat 72 is the valve component having the specially shaped orifices (e.g., L-shaped, or T-shaped, etc.), while the valve member 74 either has similar specially shaped orifices (see FIGS. 4A-F) or has differently shaped orifices (see FIGS. 5A-E). Alternatively, however, the valve member could have specially shaped orifices (e.g., like the valve seat orifices 73 in FIGS. 5A-E) while the valve seat has differently shaped orifices (e.g., like the valve member orifices 75 in FIGS. 5A-E).

As another example of the fine-tuning of the evolution of the valve flow passages made possible by the invention, the valve seat orifices 73 can have a first circumferential spacing (e.g., uniform) about the circumference, and the valve member orifices 75 can have a second circumferential spacing (e.g., non-uniform) different from the first circumferential spacing. It is further possible (though not essential) in such an embodiment for the orifices in the valve member to be of different sizes and/or shapes from the orifices in the valve seat. This could result in, for example, one flow passage (or some other subset of the total number of flow passages) beginning to open before any of the other flow passages begin to open, thereby achieving a very gradual cracking open of the bypass valve. Further rotation of the valve member would then cause the other flow passages to open (perhaps in a sequential or staged fashion, e.g., one flow passage opening at a time until finally all flow passages are open). These are merely some examples of the many different ways the orifices can be configured so as to achieve a desired flow passage evolution as a function of valve member rotation.

If desired or necessary in a particular application, surfaces of components that relatively slide over one another can be coated with a friction/wear coating that reduces wear of the surfaces. For example, the raised pads 73p on the valve seat and/or the surface of the valve member that the pads contact can be coated with such a coating. Other surfaces that can be coated include the end of the L-shaped drive arm 162 and/or the surfaces of the rotor 130 or valve member 74 contacted by the end of the drive arm. The radially inner and/or outer surfaces of the valve member 74 and/or the confronting surfaces of the turbine housing portion 52a and the member 53 can be coated with the wear coating. The wear coating can be formed of various materials, including an aluminum diffusion coating, a nickel boron coating, a ceramic coating (e.g., silicon nitride). In order to avoid material transfer from one surface to an abutting surface, preferably the two surfaces are coated with different materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
a compressor wheel mounted within a compressor housing;
a turbine housing defining at least part of a generally annular chamber extending circumferentially about a longitudinal axis of the turbine housing, the turbine housing defining a bore extending along the longitudinal axis;
a turbine wheel disposed in the turbine housing;
a nozzle passage leading from the chamber radially inwardly into the turbine wheel;
the turbine housing defining an annular bypass passage surrounding the bore and arranged to allow exhaust gas in the chamber to bypass the turbine wheel; and
an annular bypass valve disposed in the bypass passage, the bypass valve comprising a fixed annular valve seat and a rotary annular valve member that is disposed against the valve seat and is rotatable about the longitudinal axis, one of the valve seat and the valve member defining a non-circular first orifice extending axially therethrough and the other of the valve seat and the valve member defining a non-circular second orifice extending axially therethrough, forming an orifice pair, the first and second orifices being arranged to overlap in some rotational positions of the valve member so as to create a flow passage formed by aligned portions of the first and second orifices,
wherein the first orifice is generally L-shaped having a first portion that extends primarily in a circumferential direction, a second portion that forms an obtuse angle with the first portion and extends primarily in a radial direction, and a third portion that forms an obtuse angle with the second portion and extends primarily in the radial direction, and the second orifice is generally L-shaped having a first portion that extends primarily in a circumferential direction, a second portion that forms an obtuse angle with the first portion and extends primarily in a radial direction, and a third portion that forms an obtuse angle with the second portion and extends primarily in the radial direction, wherein the three portions of the second orifice interact with the three portions of the first orifice to provide three distinct phases in a curve of flow area A versus valve member rotational position as the first and second orifices begin to overlap and then become further overlapped with further rotation of the valve member, such that the curve of flow area A exhibits a first phase of evolution of the flow area A from zero up to a value $A_1$ and then a second phase of evolution of the flow area from the value $A_1$ up to a value $A_2$, followed by a third phase extending from flow area $A_2$ up to the maximum flow area $A_{max}$ and such that the first phase and the second phase have distinctly different slopes on the curve of flow area A versus rotational position of the valve member, with a distinct break point in the curve between said first and second phases, and the second phase and the third phase have distinctly different slopes on the curve of flow area A versus rotational position of the valve member, with a distinct break point in the curve between said second and third phases.

2. The turbocharger of claim 1, wherein there are a plurality of first orifices spaced apart in a circumferential direction of the bypass valve and a like plurality of second orifices spaced apart in the circumferential direction, forming a plurality of orifice pairs each configured to have said first, second, and third phases of evolution of the flow area.

3. The turbocharger of claim 2, wherein at least one of the first orifices has a different shape from other ones of the first orifices, and correspondingly at least one of the second orifices has a different shape from other ones of the second orifices, the/each differently shaped first orifice forming an orifice pair with the/each differently shaped second orifice.

4. An annular bypass valve for a turbine, comprising a fixed annular valve seat and a rotary annular valve member that is disposed against the valve seat and rotatable about a longitudinal axis, one of the valve seat and the valve member defining a non-circular first orifice extending axially therethrough and the other of the valve seat and the valve member defining a non-circular second orifice extending axially therethrough, forming an orifice pair, the first and second orifices being arranged to overlap in some rotational positions of the valve member so as to create a flow passage formed by aligned portions of the first and second orifices, wherein the first orifice is generally L-shaped having a first portion that extends primarily in a circumferential direction, a second portion that forms an obtuse angle with the first portion and extends primarily in a radial direction, and a third portion that forms an obtuse angle with the second portion and extends primarily in the radial direction, and the second orifice is generally L-shaped having a first portion that extends primarily in a circumferential direction, a second portion that forms an obtuse angle with the first portion and extends primarily in a radial direction, and a third portion that forms an obtuse angle with the second portion and extends primarily in the radial direction, wherein the three portions of the second orifice interact with the three portions of the first orifice to provide three distinct phases in a curve of flow area A versus valve member rotational position as the first and second orifices begin to overlap and then become further overlapped with further rotation of the valve member, such that the curve of flow area A exhibits a first phase of evolution of the flow area A from zero up to a value $A_1$ and then a second phase of evolution of the flow area from the value $A_1$ up to a value $A_2$, followed by a third phase extending from flow area $A_2$ up to the maximum flow area $A_{max}$ and such that the first phase and the second phase have distinctly different slopes on the curve of flow area A versus rotational position of the valve member, with a distinct break point in the curve between said first and second phases, and the second phase and the third phase have distinctly different slopes on the curve of flow area A versus rotational position of the valve member, with a distinct break point in the curve between said second and third phases.

5. The annular bypass valve of claim 4, wherein there are a plurality of first orifices spaced apart in a circumferential direction of the bypass valve and a like plurality of second orifices spaced apart in the circumferential direction, forming a plurality of orifice pairs each configured to have said first, second, and third phases of evolution of the flow area.

6. The annular bypass valve of claim 5, wherein at least one of the first orifices has a different shape from other ones of the first orifices, and correspondingly at least one of the second orifices has a different shape from other ones of the second orifices, the/each differently shaped first orifice forming an orifice pair with the/each differently shaped second orifice.

* * * * *